United States Patent [19]

Venäläinen et al.

[11] Patent Number: 4,699,775

[45] Date of Patent: Oct. 13, 1987

[54] CATALYST AND METHOD FOR PRODUCING HYDROGEN GAS FROM CARBON MONOXIDE AND WATER

[75] Inventors: Tapani Venäläinen; Tapani Pakkanen; Tuula Pakkanen, all of Joensuu; Eero Iiskola, Porvoo, all of Finland

[73] Assignee: Neste Oy, Finland

[21] Appl. No.: 738,783

[22] Filed: May 29, 1985

[30] Foreign Application Priority Data

May 30, 1985 [FI] Finland ................................. 842175

[51] Int. Cl.$^4$ ............................................... C01B 3/16
[52] U.S. Cl. .................................... 423/655; 502/161; 502/167
[58] Field of Search ................ 502/161, 167; 423/655

[56] References Cited

U.S. PATENT DOCUMENTS

| | | | |
|---|---|---|---|
| 3,804,914 | 4/1974 | Fahey | 502/161 |
| 3,855,307 | 12/1974 | Rony et al. | 502/161 |
| 4,169,853 | 10/1979 | Knifton | 502/161 |
| 4,344,866 | 8/1982 | Pesa et al. | 502/161 |

OTHER PUBLICATIONS

Choudhury & Cole-Hamilton, *J. Chem. Soc.*, Dalton Trans., 1885, 1982.

*Primary Examiner*—John Doll
*Assistant Examiner*—Wayne A. Langel
*Attorney, Agent, or Firm*—Steinberg & Raskin

[57] ABSTRACT

A catalyst for producing hydrogen gas from carbon monoxide and water, and a procedure for generating hydrogen gas from carbon monoxide and water in the presence of a catalyst. The catalyst is formed from a complex of a group VIII metal carbonyl and a heterocyclic base, and is of the formula $M_{3-n} M'_n (CO)_{12-x} L_x + yB$ wherein
$M = Ru$
$M' = Fe$
n is 0, 1 or 2
x is 0, 1 or 2
L is a triaryl or trialkyl phosphine or phospite,
B is a chelating bidentate aromatic heterocyclic nitrogen-containing base, and
y is a whole or fractional number from 1–6.

9 Claims, No Drawings

CATALYST AND METHOD FOR PRODUCING HYDROGEN GAS FROM CARBON MONOXIDE AND WATER

BACKGROUND OF THE INVENTION

The present invention concerns a catalyst for producing hydrogen gas from carbon monoxide and water. The invention also concerns a procedure for producing hydrogen gas from carbon monoxide and water in the presence of a catalyst. The transfer reaction of water gas $CO + H_2O \leftrightarrow CO_2 + H_2$ is used for producing hydrogen and for increasing the hydrogen content of synthesis gas. The most important areas of industrial application are hydrogen production, Fischer-Tropsch synthesis and ammonia synthesis. The reaction is exothermic, and therefore highest conversion in equilibrium is achieved at low temperature. The pressure has no effect on the equilibrium.

Metal oxide mixtures have been used as heterogeneous catalysts for the reaction (Satterfield: Heterogeneous Catalysis in Practice, McGraw Hill 1980). In a process operating at high temperatures of 325° to 550° C., a mixture of iron oxide $Fe_3O_4$ and chromium oxide $Cr_2O_3$ has been used. High temperatures are indispensable for achieving sufficient reaction speed. The pressure in the process is about 3 MPa. The high operating temperature of the catalyst is a disadvantage, because there is carbon monoxide in the reaction equilibrium, which has to be removed in ammonia synthesis, for example.

For the transfer reaction of water gas, heterogeneous cataysts operating at lower temperatures have also been developed, which are used in association with high temperature catalysis. These catalysts contain copper oxide CuO, zinc oxide ZnO and aluminium oxide $Al_2O_3$. The operating temperature is about 200° C. and pressure is about 1.3 MPa.

Both catalyst types are pyrophoric and must therefore be handled under oxygen-free conditions.

Catalysis of the transfer reaction of water gas may also be achieved with homogeneous catalysts in a solution at low pressure and temperature. Rhodium and iridium carbonyl iodides (U.S. Pat. Nos. 4,151,107 and 4,107,076) along with other group VIII metal compounds (U.S. Pat. Nos. 3,490,872 and 3,539,298) for example, may serve as catalysts.

However, the industrial application of homogeneous catalysts of the prior art has been prevented by the low activity thereof.

SUMMARY OF THE INVENTION

Accordingly, it is an object of the present invention to achieve improvement over the disadvantages of the prior art, noted above.

It is also an object of the present invention to achieve improvement in the generation of hydrogen gas from carbon monoxide and water, with a catalyst present.

It is another object of the present invention to improve generation of hydrogen gas from carbon monoxide and water, at lower temperatures and pressures.

It is a further object of the present invention to provide a catalyst for generating hydrogen gas from carbon monoxide and water, which is considerably superior to catalysts of the prior art, having improved activity thereover, especially at lower temperatures and pressures.

It is still a further object of the present invention, to improve energy economy in the transfer reaction of water gas from carbon monoxide and water.

It is even another object of the present invention to allow the transfer reaction of water gas from carbon monoxide and water to be carried out with simplified equipment.

These and other objects are attained by the present invention which provides a catalyst that is a complex of a group VIII metal carbonyl with a heterocyclic base. The group VIII metal carbonyl is $Ru_3(CO)_{12}$, $FeRu_2(CO)_{12}$, $Fe_2Ru(CO)_{12}$, or the derivative thereof $M_3(CO_{12-x}L_x)$, where M is Ru or Fe, $x = 1$ or 2, and L is a trialkyl or triarylphosphine or -phosphite. The heterocyclic base is 2,2'-bipyridine or 1,10-phenanthroline.

The method of the present invention is principally characterized by reacting carbon monoxide and water in the presence of a complex of group VIII metal carbonyl and heterocyclic base, as a catalyst. The catalyst is in the form of an aqueous suspension, or is bonded to a carrier.

DESCRIPTION OF THE PREFERRED EMBODIMENTS

A catalyst which is a complex of ruthenium carbonyl or a derivative thereof and bipyridine or a corresponding heterocyclic nitrogen compound accelerates the transfer reaction of water gas more efficiently at low temperature and pressure, than catalysts of the prior art. The reaction itself is preferably carried out at a temperature of 50°–400° C. and at a pressure of 0.01–10 MPa, with the catalyst of the present invention. However, the reaction speed can already be accelerated at low temperatures of 80°–150° C. and at low pressures of 0.04–0.2 MPa. The energy economy of the reaction can be substantially improved, and the equipment simplified.

The present invention is based on observations, in particular, concerning the reaction of carbon monoxide and water in the presence of the complex of ruthenium carbonyl $Ru_3(CO)_{12}$ and 2,2'-bipyridine in carbon monoxide.

The complex of these two starting materials constitute, at about 80°–100° C. and at about 0.05 MPa, a blue, air-sensitive complex, which is slightly soluble in organic solvents. This complex, which is a carbonyl compound containing ruthenium and 2,2'-bipyridine, catalyzes the transfer reaction of water gas both in the gas phase and as a suspension in the solution phase.

The catalytic properties of ruthenium carbonyl and of 2,2'-bipyridine in the water gas transfer reaction, have been earlier reported (Choudhury & Cole-Hamilton, J. Chem. Soc. Dalton Trans. 1885, 1982), but the catalytic properties were not such to provide a useful catalyst. The catalyst provided by the present invention has an activity one order of magnitude higher than any catalyst of the prior art functioning under equivalent conditions. $FeRu_2(CO)_{12}$, $Fe_2Ru(CO)_{12}$ and the phosphine and phosphite derivatives of $Ru_3(CO)_{12}$, $FeRu_2(CO)_{12}$ and $Fe_2Ru(CO)_{12}$ have also been found to serve as starting material for the catalyst complex, in addition to $Ru_3(CO)_{12}$. Substituted 2,2'-bipyridines and corresponding phenanthroline compounds ae also active in the role of the heterocyclic base, in addition to 2,2'-bipyridine.

More particularly, the catalyst for producing hydrogen gas from carbon monoxide and water in accordance with the present invention, may be formed of a group VIII metal carbonyl of the formula $$M_{3-n}M'_n(CO)_{12-x}L_x + y\ B$$

wherein M=Ru, M'=Fe, n=0-2, x=0-2, L is a triaryl or trialkyl phosphine or phosphite, B is a chelating bidentate aromatic heterocyclic nitrogen-containing base, and y is an integer or fractional number in the range of 1-6. The catalyst of this particular formula may be activated 24-48 hours time at temperatures from 80° to 200° C., and at 0.01-10 MPa carbon monoxide pressure in the presence of water.

The present invention will be further explained below by way of the following examples, which describe the manufacturing of the catalyst of the present invention, in addition to the catalytic properties thereof in the transfer reaction of water gas.

EXAMPLE I

Ruthenium carbonyl $Ru_3(CO)_{12}$ (0.15 mmol) and 2,2'-bipyridine (1.0 mmol) were dissolved in hydrogen-free cyclohexane (0.1 dm$^3$). When the resulting solution was refluxed at 80° C., black complex started to precipitate in about one-half hour. In three hours time, all $Ru_3(CO)_{12}$ had reacted. The produced precipitate was filtered and washed with oxygen-free hexane and vacuum-dried. The compound becomes catalytically activated in 24-48 hours time at a temperature of 100° C. and 0.05 MPa carbon monoxide pressure, in the presence of water.

EXAMPLE II

Metal carbonyl and the concomitant heterocyclic base on the same line of Table I, were reacted with one another according to the procedure of Example I:

TABLE I

| Metal carbonyl | Base |
|---|---|
| $Ru_3(CO)_{12}$ | 1,10-phenanthroline |
| $FeRu_2(CO)_{12}$ | 2,2'-bipyridine |
| $Fe_2Ru(CO)_{12}$ | 2,2'-bipyridine |
| $Ru_3(CO)_{11}PPh_3$ | 2,2'-bipyridine |

EXAMPLE III

The catalyst may also be produced directly on the surface of a carrier, in the following manner. Ruthenium carbonyl $Ru_3(CO)_{12}$ (0.15 mmol), and 2,2'-bypyridine (1.0 mmol) were dissolved in dichloromethane (0.05 dm$^3$). The solution was absorbed in silicagel (3.0 g), with the solvent thereafter evaporated off by evacuation. The thus-impregnated gel was heated to 100° C. under protective gas (CO, $N_2$) or in a vacuum, whereby the color of the gel turns dark blue. The gel becomes catalytically activated in 24-28 hours at 100° C. temperature and at 0.05 MPa carbon monoxide pressure.

EXAMPLE IV

Any of the complexes according to Examples I and II, catalyzes the transfer reaction of water gas in the following manner.

In a reaction flask (0.035 dm$^3$), a complex (0.01 mmol, calculated on the basis of the quantity of $Ru_3(CO)_{12}$ either in a water suspension or bonded to a carrier), water (50.0 mmol), carbon monoxide (0.736 mmol), and methane serving as an internal standard, were enclosed. The reaction flask was placed in an oil bath of 150° C. After 15 minutes reaction time, the temperature was lowered to 25° C., and a gas analysis was carried out. The reaction flask contained 0.30 mmol CO, 0.46 mmol $CO_2$ and 0.46 mmol $H_2$. On the basis of this result, the activity of the catalyst was calculated in units of mol $H_2$/mol catalyst×24 hours, with the activity of the catalyst calculated to be 4400.

EXAMPLE V

The experiment of Example IV was repeated with a 40 minute reaction time, whereby 0.804 mmol CO and 50 mmol $H_2O$ reacted, to yield 0.77 mmol $H_2$ and $CO_2$. The carbon monoxide residue was 0.014 mmol. The activity of the catalyst was calculated to be 2,770. This lower activity, compared with the activity determined in Example IV, is caused by the depletion of the starting material. Longer reaction time results in a thermodynamic equilibrium of the reaction, at which there is less than 0.1 mol % CO. The reaction may be continued several times by recharging the flask with CO. The activity of the catalyst is not significantly lowered in successive experiments.

EXAMPLE VI

The activities of the following catalysts of Example II were calculated according to the experimental procedure of Example IV, at a temperature of 100° C. The resulting activities are reported in Table II below:

TABLE II

| Metal carbonyl | Base | Activity ($H_2$) |
|---|---|---|
| $Ru_3(CO)_{12}$ | 2,2'-bipyridine | 694 |
| $Fe_2Ru(CO)_{12}$ | 2,2'-bipyridine | 20 |
| $FeRu_2(CO)_{12}$ | 2,2'-bipyridine | 34 |
| $Ru_3(CO)_{12}$ | 1,10-phenanthroline | 80 |
| $Ru_3(CO)_{11}PPH_3$ | 2,2'-bipyridine | 65 |

COMPARATIVE EXAMPLE I

The catalysis experiments were carried out for some other $Ru_3(CO)_{12}$-heterocyclic base-systems in conditions corresponding to the experimental procedures of Examples IV and VI. The results are reported in Table 3 below. The systems are homogeneous, and the activities thereof are some orders of magnitude lower than the $Ru_3(CO)_{12}$-bipyridine system of the present invention. Some bases, such as pyrrolidine, form mediocre hydrogen production systems, but react with carbon dioxide, so any real catalysis does not occur in these systems.

TABLE III

| Base/solvent | mol $H_2$ mol cat. 24 h | mol $CO_2$ mol cat. 24 h |
|---|---|---|
| Pyridine | 15 | 15 |
| Pyridine/ethoxyethanol | 7 | 8 |
| Pyridine/DMSO | 5 | 5 |
| Pyridine/diglym | 5 | 6 |
| Piperidine | 10 | 0 |
| Piperidine/ethoxyethanol | 8 | 0 |
| Piperidine/DMSO | 2 | 0 |
| Piperidine/diglym | 10 | 0 |
| Trimethylamine/diglym | 0 | 0 |
| Triethylamine/diglym | 4 | 1 |
| Trimethylamine/ethoxyethanol | 0 | 1 |
| Pyrrolidine | 117 | 0 |
| Pyrrolidine/diglym | 2 | 0 |
| Aniline/diglym | 0 | 7 |
| Pyrrol/diglym | 0 | 3 |
| 2-dimethylaminoethanol | 7 | 4 |
| 2-diethylaminoethanol | 0 | 1 |
| N,N—diethylaniline | 4 | 0 |
| Diethanolamine | 30 | 0 |

TABLE III-continued

| Base/solvent | mol H₂ mol cat. 24 h | mol CO₂ mol cat. 24 h |
|---|---|---|
| Diethanolamine, CO₂ saturated | 16 | 0 |
| Neocuproin/diglym | 18 | 20 |
| Ethylenediamine | 48 | 0 |
| Quinnolin/diglym | 0 | 0 |
| Benzylamine/diglym | 0 | 2 |
| 1,10-phenanthroline/diglym | 13 | 13 |

EXAMPLE VII

The catalysts of the present invention listed in Examples I and II, may be formed from three moles of respective heterocyclic base:mole of metal carbonyl.

The preceding description of the present invention is merely exemplary, and is not intended to limit the scope thereof in any way.

What is claimed is:

1. Method of producing $H_2$ gas from CO and $H_2O$, which comprises reacting said CO and $H_2O$ in the presence of a complex of a group VIII metal carbonyl and a heterocyclic base, said complex having the formula:

$$M_{3-n}M'_n(CO)_{12-x}L_x + yB$$

wherein
M = Ru
M' = Fe
n is 0, 1 or 2
x is 0, 1 or 2
L is a triaryl or trialkyl phosphine or phosphite
B is a chelating bidentate aromatic heterocyclic nitrogen-containing base, and
y is a whole or fractional number from 1–6.

2. Method according to claim 1 wherein B is a bipyridine or phenanthroline.

3. Method according to claim 1 wherein B is 2,2′—bipyridine or 1,10-phenanthroline.

4. Method according to claim 1 wherein said complex is
   $Ru_3(CO)_{12} + 3$ 2,2′-bipyridine,
   $Ru_3(CO)_{12} + 3$ 1,10-phenanthroline,
   $Ru_3(CO)_{11}PPh_3 + 3$ 2,2′-bipyridine,
   $Fe_2Ru(CO)_{12} + 3$ 2,2′-bipyridine, or
   $FeRu_2(CO)_{12} + 3$ 2,2′-bipyridine.

5. Method according to claim 1 wherein said complex is suspended in water.

6. Method according to claim 1 wherein said complex is bonded to a carrier.

7. Method according to claim 6 wherein said carrier is silica gel.

8. Method according to claim 1 wherein the reaction is carried out at a temperature of 50°–400° C. and at a pressure of 0.01–10 MPa.

9. Method according to claim 1 wherein the reaction is carried out at a temperature of 80°–150° C. and at a pressure of 0.04–0.2 MPa.